Jan. 26, 1960    H. R. BELLOLI    2,922,656
COLLET STOP FOR LATHES
Filed May 13, 1958
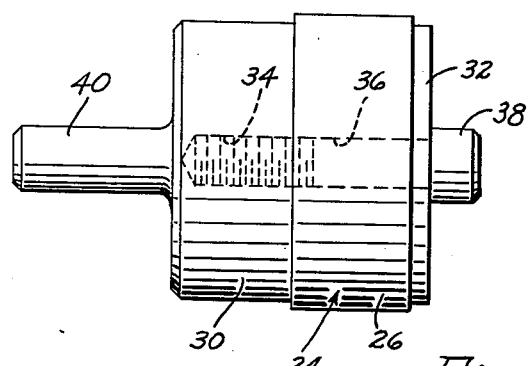
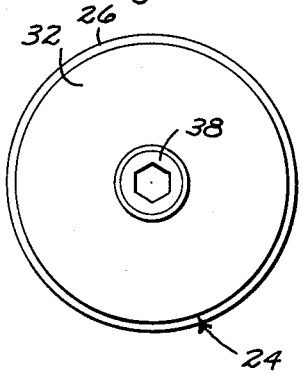
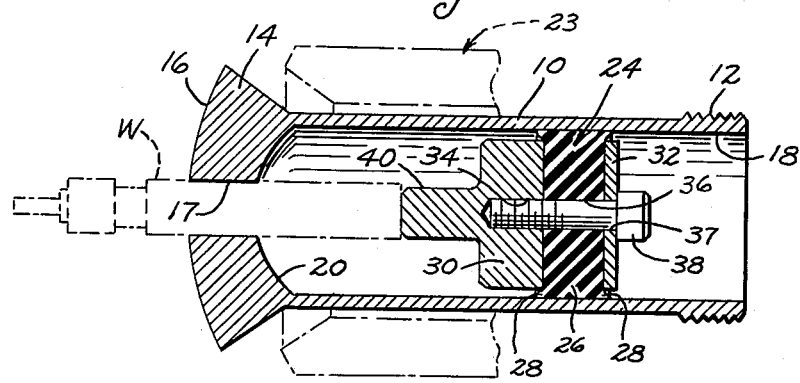
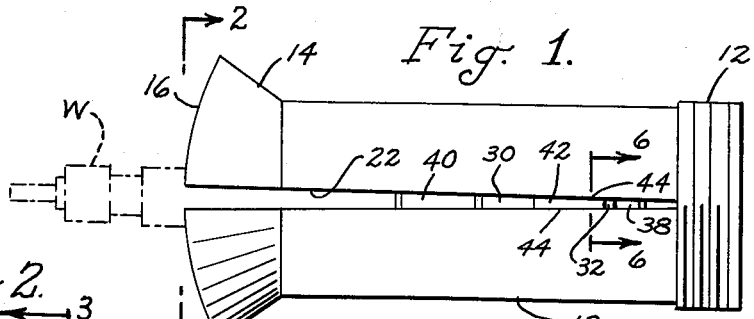
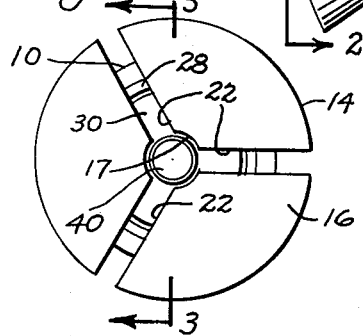
INVENTOR.
HENRY R. BELLOLI
BY
McMorrow, Berman + Davidson
ATTORNEYS

United States Patent Office 2,922,656
Patented Jan. 26, 1960

2,922,656

COLLET STOP FOR LATHES

Henry R. Belloli, Framingham, Mass.

Application May 13, 1958, Serial No. 735,020

6 Claims. (Cl. 279—46)

This invention is a work-engaging stop insertable in a conventional lathe collet. Among important objects of the invention are:

To effect swift, easy adjustment of the stop longitudinally of and within the collet;

To effect swift locking of the stop in each position to which it is so adjusted;

To provide a stop which will be of particularly simple, durable, and inexpensive construction;

To design the stop so that it can be readily made in different sizes, to fit the variously sized, conventional lathe collets;

To reduce the number of parts in a collet stop to a minimum without loss of full adjustability and quickly effected locking and unlocking actions; and To permit use of the stop in conventional lathe collets without requiring any modification or redesign of said collets.

Other objects will appear from the following description, the claims appended thereto, and from the annexed drawing, in which like reference characters designate like parts throughout the several views, and wherein:

Figure 1 is a side elevational view of a collet equipped with my stop, a work piece being shown in dotted lines;

Figure 2 is an end elevation, as seen from the line 2—2 of Figure 1;

Figure 3 is a longitudinal section substantially on line 3—3 of Figure 2, a collet-contracting component of the lathe being shown in dotted lines, the work being shown in dotted lines;

Figure 4 is an enlarged elevational view of the stop per se;

Figure 5 is an end elevation of the stop as seen from the right of Figure 4; and Figure 6 is a fragmental sectional view along line 6—6 of Fig. 1.

Referring to the drawing in detail, a conventional, elongated, cylindrical collet 10 is hollow for the greatest part of its length, and is formed open at one end. At its other end, it has a flaring collar 14 constituting the marginal portion of a thick end wall 16 having a center opening 17 for receiving a work piece W that is to be machined. External threads 12 are provided on the open end of the collet, the bore of the collet being designated at 18, the end wall 16 closing the bore at the head end of the collet except, of course, for the provision of the center opening 17. End wall 16 is of concavo-convex formation, having its convex face or side disposed at the outside of the device, with the concave face 20 being faced inwardly.

The collet has the usual longitudinal slots 22 opening upon the head end of the collet, said slots radiating from and being in communication with the several openings 17 as shown in Figure 2, and being angularly spaced 120 degrees apart circumferentially of the collet. Slots 22 are progressively reduced in width in a direction from their open, head ends, to their closed inner ends.

Designated generally at 23 is the collet-receiving portion of the lathe, so designed that it will exert a cam action against the flared collar 14 on relative axial movement of the collet and said portion 23, thus to radially contract the head end of the collet into gripping engagement with the work W. This is wholly conventional and in and of itself does not comprise part of the present invention.

My stop 24 includes a circular, thick, soft rubber body 26 compressible in an axial direction. This expands the body radially into engagement with the wall of collet 10, deforming the periphery of the body into lips 28, extending about a base 30 and a washer 32 that bears against opposite faces of body 26. The base and washer are of equal diameter, said diameter being slightly less than the inside diameter of collet 10. Body 26, when not compressed, is of a diameter slightly less than the inside diameter of the collet, to permit free insertion and removal of the stop, but is slightly greater in diameter than the diameters of base 30 and washer 32.

In registration are a threaded, axial recess 34 of base 30, a smooth-walled center opening 36 of body 26, and a center opening 37, also smooth-walled, of washer 32. A screw 38 extends through the registering openings 37, 36 and threads into recess 34, having a head bearing against the outer face of washer 32. Obviously, threading the screw into recess 34 will compress body 26, to expand the same into gripping engagement with the wall of collet 10.

Projecting forwardly from base 30 is an axial projection 40 of reduced diameter, providing an abutment for the inner end of work piece W.

Obviously, the invention has marked advantages over conventional stops. The stop is quickly insertable in or removable from the collet, and when inserted, is readily adjustable axially of the collet. In any selected position to which it is adjusted, the stop is swiftly adjusted into full, tight locking engagement with the collet, responsive merely to threading of the screw 38 into the recess 34, in a manner to relatively move body 30 and washer 32 toward each other for compressing the body 26. Once adjusted into locking engagement with the collet, the stop will not move axially of the collet until unlocked. Unlocking of course is effected with equal ease, whenever desired.

A still further improved locking action results from a coactive relationship between the stop and the collet, in that after the base 30 and washer 32 have been relatively moved axially toward each other to radially expand the body 26, the slotted wall of the collet itself is radially contracted by means of the portion 23, which might be, for example, the spindle nose hood of the lathe. This contraction produces an even stronger locking action between the body 26 and the wall of the collet, and said action is still further aided by reason of the fact that the peripheral surface of the radially expanded body 26 will now be forced into the slots 22, producing narrow, tongue-like projections 42 (Figures 1 and 6) extending into the several slots 22 and frictionally gripping opposite walls of the slots at the sides 44 of said tongue-like projections.

It is believed apparent that the invention is not necessarily confined to the specific use or uses thereof described above, since it may be utilized for any purpose to which it may be suited. Nor is the invention to be necessarily limited to the specific construction illustrated and described, said construction only being intended to be illustrative of the principles of operation and the means for carrying out said principles, it being considered that the invention comprehends any minor change in construction that may be permitted within the scope of the appended claims.

What is claimed is:

1. The combination, with a radially contractable collet, of a work stop insertable in said collet and comprising relatively axially movable members one of which provides an abutment for a work piece gripped by the collet; a resiliently compressible body interposed between said members, whereby to be expanded radially by compression of the same responsive to relative axial movement of the members toward each other, said radial contraction of the collet and said radial expansion of the body coacting to produce a tight grip of the body against the collet; and means extending through the body and through said members adapted for drawing said members toward each other in an axial direction to compress the body, said body being of a readily deformable, soft material, said material on contraction of the collet and expansion of the body having circumferential lips at opposite faces of the body, projecting outwardly from the body in opposite directions in engagement with the wall of the collet, said body being of a greater dimension at its periphery, measured axially of the stop, than the distance between the members measured in the same direction, when the members are drawn together in their body-expanding positions.

2. The combination, with a collet radially contractable for at least part of its length, of a work stop engaged in said collet and comprising relatively axially displaceable members one of which provides an abutment for a work piece gripped by the collet; a resiliently compressible body interposed between said members in contact with the contractable part of the collet, said body expanding radially responsive to compression of the same upon relative axial movement of the members toward each other, and binding tightly against the collet upon radial contraction of the collet about the expanded body; and means extending through the body and through said members adapted for drawing said members toward each other in an axial direction to compress the body.

3. The combination of claim 2, wherein said part of the collet has a plurality of longitudinally extending, angularly spaced slots for effecting the radial contraction of the collet, said slots defining interstices in said part of the collet into which the peripheral portion of the body is forced into engagement with the opposite side walls of the slots, responsive to said radial expansion of the body by the members and the accompanying radial contraction of the collet about the expanded body.

4. In a work holder for a lathe having a collet-receiving portion formed with a flared cam surface the combination, with a hollow, cylindrical collet having an open rear end and having a head end formed with a central work piece-receiving aperture and with a collar flared for camming engagement of the same by said surface on relative axial displacement of the collet and said portion, said collet having over part of its length a series of angularly spaced, interstice-defining, longitudinal slots opening upon said head end for radial contraction of said part and gripping of the work piece within the aperture in response to said camming engagement, of a stop for the work piece comprising: a base within and shiftable longitudinally of said part of the collet, including an abutment facing toward said head end for engagement by the work piece; a screw threadedly engaged in the body and extending axially thereof toward said open end of the collet, said screw including a head spaced longitudinally of the collet from the body and disposed to be readily accessible by a screw-rotating tool inserted through said open end; a washer circumposed about the screw in engagement with the head; and a soft, resiliently deformable body circumposed about the screw between the washer and said base in the slotted part of the collet, said body expanding radially in response to said relative axial movement of the base and washer toward each other resulting from rotation of the screw in one direction, said body entering the interstices defined by the slots to bind tightly against the collet on radial contraction of said part of the collet about the expanded body.

5. The combination of claim 4 wherein the body in its expanded condition includes circumferential lips on its opposite faces compressed between the collet and the base and washer respectively, in overlapping relation to said base and washer.

6. The combination of claim 4 wherein the slots are progressively decreased in width in a direction from the head end to the open end of the collet, to produce a correspondingly progressive reduction in width of the interstices in a direction toward said open end of the collet, constituting each portion of an interstice in which the material of the body has been received, as a wedge-shaped area the shape of which is effective to produce a resistance to movement of the body away from the head end of the collet.

References Cited in the file of this patent

UNITED STATES PATENTS

| | | |
|---|---|---|
| 2,423,551 | Caffin | July 8, 1947 |
| 2,542,967 | Waechter | Feb. 20, 1951 |
| 2,801,503 | Pass | Aug. 6, 1957 |
| 2,830,821 | Bystrom | Apr. 15, 1958 |